(12) United States Patent
Mitchell et al.

(10) Patent No.: US 7,467,687 B2
(45) Date of Patent: Dec. 23, 2008

(54) THERMAL—ACOUSTIC ENCLOSURE

(75) Inventors: Stephen Craig Mitchell, West Chester, OH (US); Jay Alan Benson, Loveland, OH (US); Glen William Royal, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 407 days.

(21) Appl. No.: 10/987,606

(22) Filed: Nov. 12, 2004

(65) Prior Publication Data

US 2006/0102419 A1    May 18, 2006

(51) Int. Cl.
*G10K 11/04* (2006.01)

(52) U.S. Cl. .............. 181/200; 181/290; 181/285; 181/294; 181/287; 181/210

(58) Field of Classification Search ............ 181/200, 181/286, 288, 290, 285, 294, 287, 210; 52/144, 52/145

See application file for complete search history.

(56) References Cited

U.S. PATENT DOCUMENTS

| | | | | |
|---|---|---|---|---|
| 3,249,659 A | * | 5/1966 | Voelker | 264/46.2 |
| 3,881,569 A | * | 5/1975 | Evans, Jr. | 181/200 |
| 3,951,228 A | * | 4/1976 | Schnell | 181/200 |
| 4,084,367 A | * | 4/1978 | Saylor et al. | 428/113 |
| 4,167,598 A | * | 9/1979 | Logan et al. | 428/34.1 |
| 4,550,798 A | * | 11/1985 | Swartz et al. | 181/201 |
| 5,210,984 A | * | 5/1993 | Eckel | 52/79.5 |
| 5,685,124 A | * | 11/1997 | Jandl, Jr. | 52/783.11 |
| 5,907,932 A | * | 6/1999 | LeConte et al. | 52/144 |
| 6,112,851 A | * | 9/2000 | Sugimoto et al. | 181/287 |
| 6,189,649 B1 | * | 2/2001 | Nitschke | 181/200 |
| 6,722,466 B1 | * | 4/2004 | Tong et al. | 181/200 |

FOREIGN PATENT DOCUMENTS

JP        407017490     *  1/1995

* cited by examiner

*Primary Examiner*—Walter Benson
*Assistant Examiner*—Forrest M Phillips
(74) *Attorney, Agent, or Firm*—Marcella R. Louke; William Scott Andes

(57) ABSTRACT

An enclosure for apparatus that, during operation, generates heat and/or sound energy comprises at least one wall defining at least a portion of the enclosure hollow interior. The wall comprises in sequence outwardly from the enclosure hollow interior an inner panel, an outer panel, a support frame between the inner and outer panels to hold the inner and outer panels spaced apart, and a vibrator isolator between the support frame and the panels. Panels or panel segments of the wall primarily are made of non-metallic composites to provide a structurally strong, lightweight enclosure that includes enhanced acoustic characteristics and reduced heat transfer through enclosure walls, along with fire protection and in-plane shear loading capabilities.

7 Claims, 8 Drawing Sheets

THERMAL—ACOUSTIC ENCLOSURE

BACKGROUND OF THE INVENTION

This invention relates to enclosures for apparatus that, during operation, generates heat and sound energy. More particularly, it relates to an enclosure for a turbine engine used for such applications as marine or industrial.

Gas turbine engines used to generate power in marine or industrial applications are required to be contained or packaged in an enclosure to reduce levels of noise or sound energy and heat generated during engine operation, as well as to provide fire protection. Typically, current designs of such enclosures include heavy metal structures based on the theory that mass is the primary factor in sound attenuation and therefore increased mass results in increased sound attenuation or transmission loss. Accordingly, the walls of current enclosures include heavy, solid and porous metal plates with a large number of stiffening beams to achieve a desired sound frequency attenuation. Damping compound is added to provide damping of acoustic energy and reduce heat transmission. The result is an extremely heavy acoustic enclosure.

In some vehicles such as marine vessels, excessive weight of an engine enclosure can require more fuel to propel the vessel. Therefore, it is advantageous and desirable to provide a lightweight enclosure that can include enhanced acoustic characteristics and reduced heat transfer through enclosure walls, along with fire protection.

BRIEF SUMMARY OF THE INVENTION

The present invention in one form provides an enclosure for apparatus that, during operation, generates heat and/or sound energy. The enclosure comprises at least one wall defining at least a portion of an enclosure hollow interior in which the apparatus is positioned for operation. The wall comprises the combination of an inner panel, an outer panel, a support frame between the inner and outer panels, and a vibrator isolator between the support frame and the panels.

The inner panel comprises, in sequence outwardly from the hollow interior, an inner panel inner sheet at the hollow interior and including a plurality of perforations therethrough, an inner panel sound absorption member comprising non-metallic sound absorption material, an inner panel outer sheet comprising non-metallic composite material, and at least one panel stiffening member between the inner panel inner sheet and the inner panel outer sheet.

The outer panel comprises, in sequence inwardly from outside of the enclosure, an outer panel sandwich member comprising non-metallic composite material including spaced-apart sandwich member first and second walls and a plurality of spaced-apart transverse walls between the sandwich member first and second walls defining sandwich member hollow chambers, and an outer panel heat and fire resistant and sound absorption member comprising non-metallic heat and fire resistant material. In a preferred form, the hollow chambers include a core of a porous, non-metallic material.

Secured between the inner and outer panels is a support frame to support and hold the inner and outer panels in spaced-apart relationship, to define a space between the inner and outer panels.

Included in the wall is a plurality of vibrator isolators, at least one between and in contact with the support frame and each of the inner panel and outer panel.

DETAILED DESCRIPTION OF THE INVENTION

Figure 1:
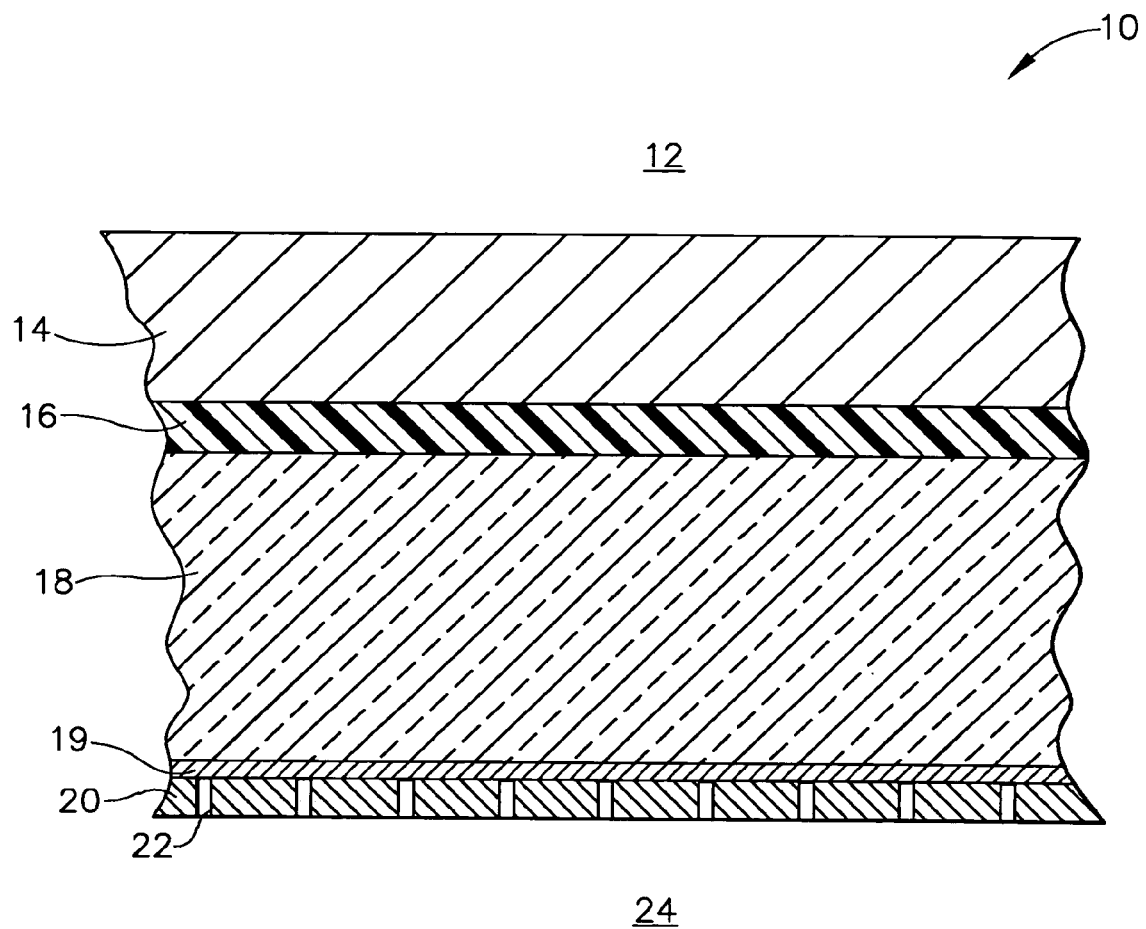
FIG. 1 is a diagrammatic, fragmentary sectional view of a current, prior art structure.

Current enclosure designs used to package or house gas turbine engines for use in marine applications provide acoustic transmission loss requirements with heavy metal structures. One form of a wall of such current, prior art enclosures is shown generally at 10 in the diagrammatic, fragmentary sectional view of FIG. 1. Wall 10 comprises, in sequence from outside 12 of enclosure wall 10, a heavy metal plate 14, a sprayed-on thick rubber coating material 16, felt batting material 18 (typically including a thin film facing 19) to provide damping of acoustic energy, and a perforated metal face sheet 20 (including pores 22 therethrough) adjacent enclosure inside or enclosure hollow interior 24. Supporting such prior art structure is a large number of heavy metal stiffening beams (not shown). Such current design results in an extremely heavy structure for an enclosure in order to satisfy specified sound energy attenuation requirements.

Forms of the present invention eliminate heavy metal walls and supports by including wall components primarily of non-metallic composite materials, including fiber reinforced composites, to provide high damping and stiffness characteristics to the wall. As a result, a lighter weight support frame can be used to provide a structurally strong yet lightweight enclosure that includes enhanced acoustic characteristics and reduced heat transfer through enclosure walls, along with fire protection and in-plane shear loading capabilities.

Figure 2:
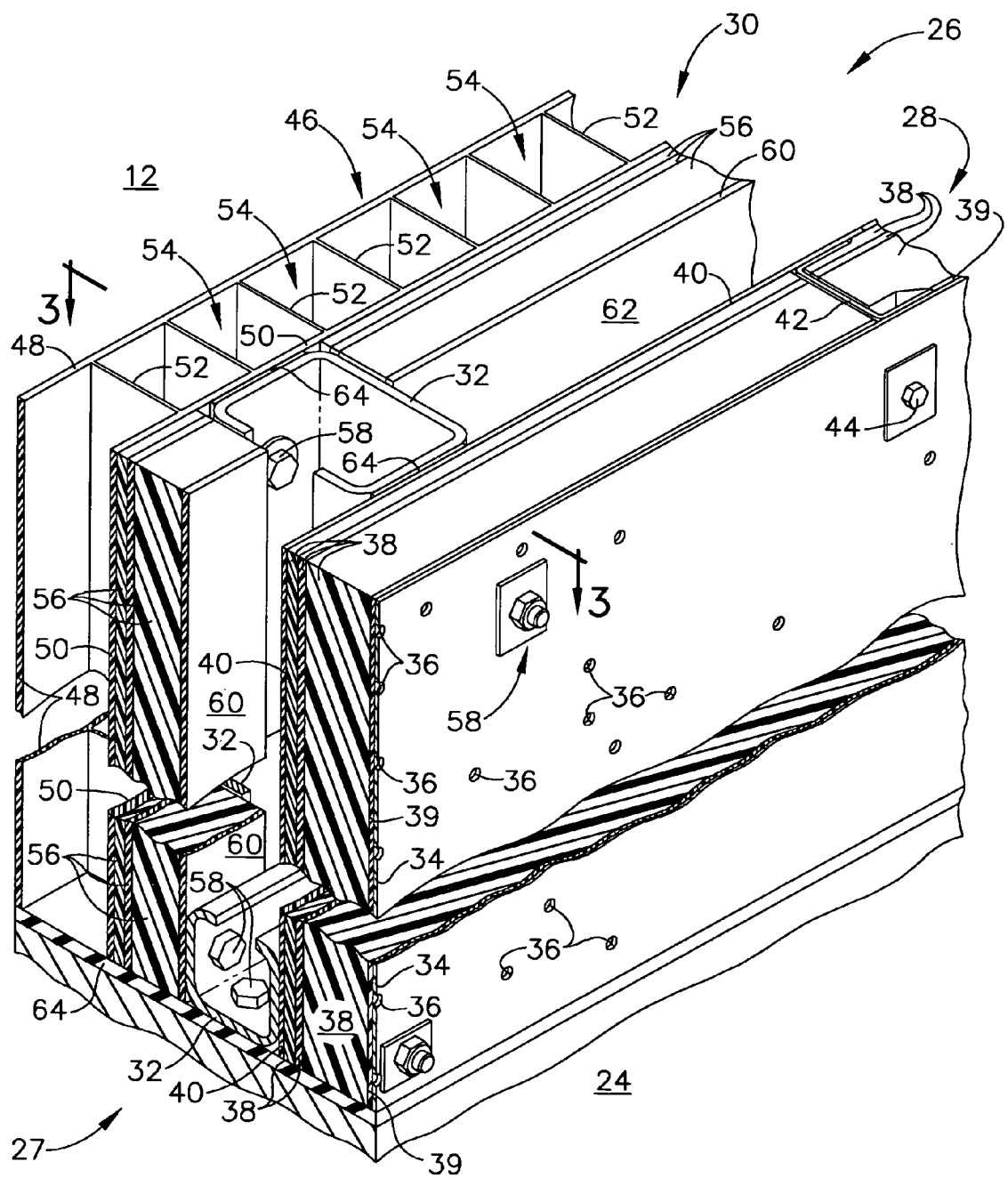
FIG. 2 is a diagrammatic, perspective, fragmentary, partially sectional view of an enclosure wall according to an embodiment of the present invention.
Figure 8:
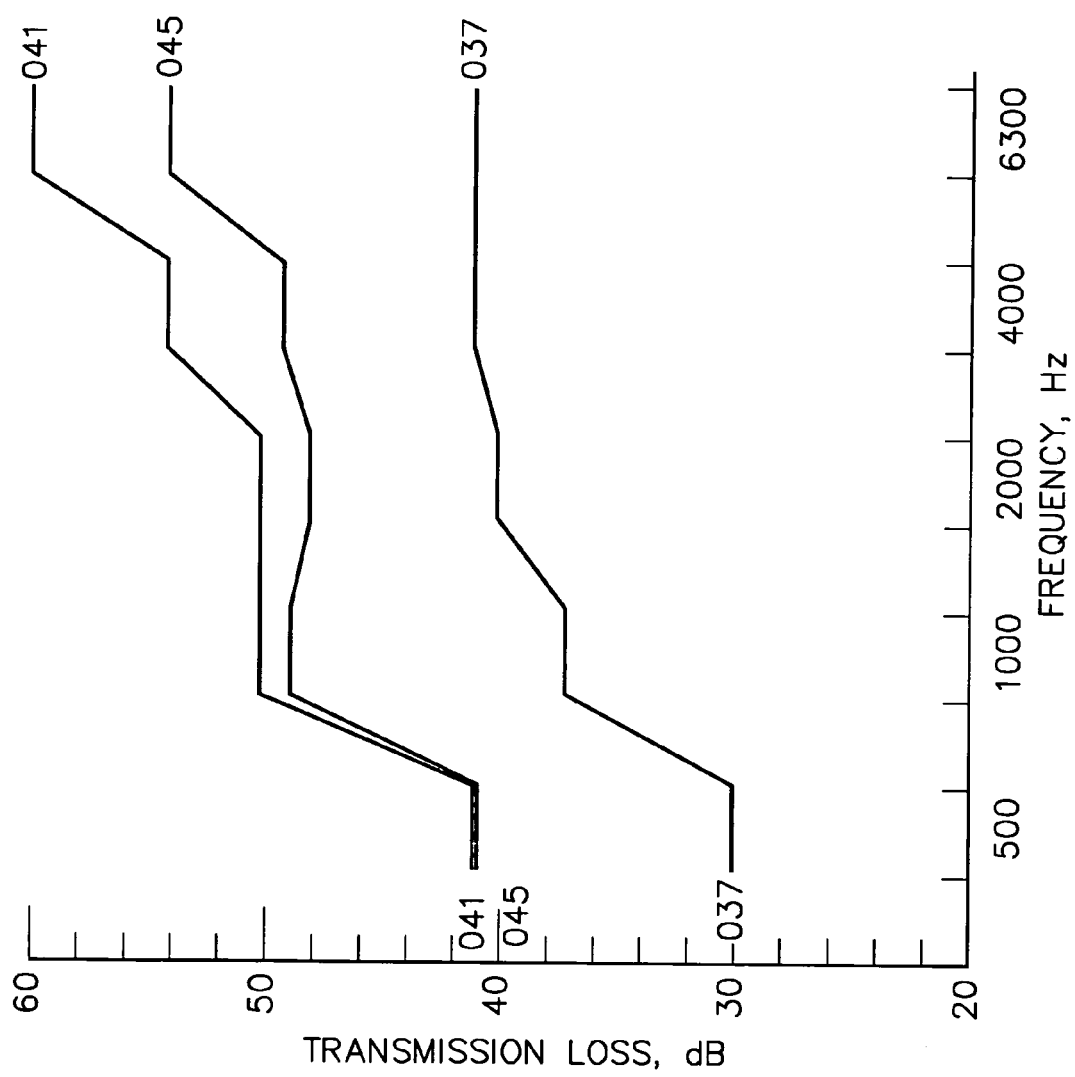
FIG. 8 is a graphical comparison of the sound transmission loss of a current, prior art enclosure wall with forms of a combination of the inner and outer panels according to the present invention.

The present invention will be more readily understood by reference to the other figures of the drawing. The diagrammatic, perspective, fragmentary, partially sectional view of FIG. 2 and the diagrammatic, fragmentary, partially sectional plan view of FIG. 3 along lines 3-3 of FIG. 2 represents an enclosure wall, shown generally at 26 according to an embodiment of the present invention. Wall 26 is for an enclosure represented generally at 27, a skeletal frame for which is shown in FIG. 8. Wall 26 comprises an inner panel shown generally at 28, an outer panel shown generally at 30, and a support frame, a portion of which is shown at 32.

Figure 3:
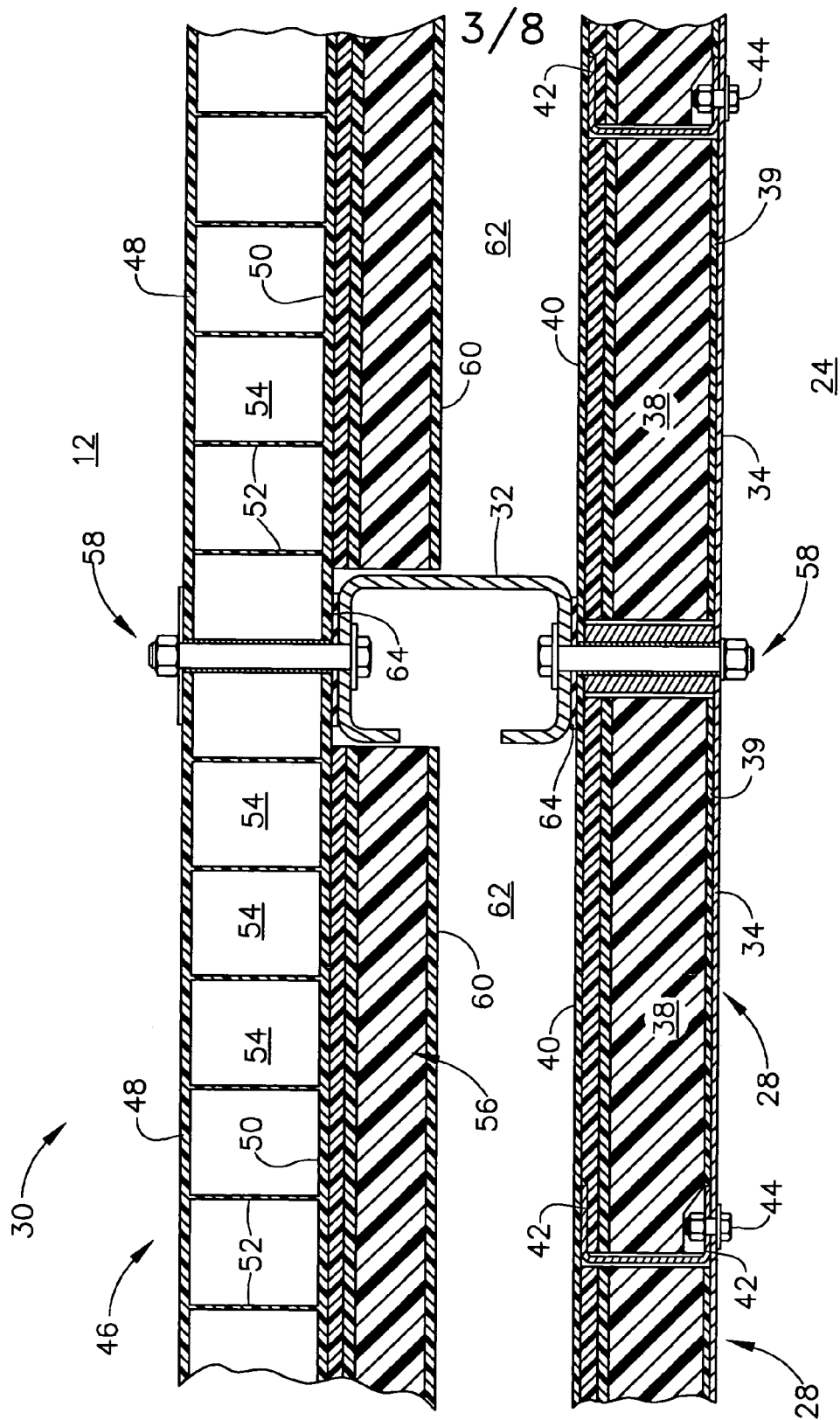
FIG. 3 is a diagrammatic, fragmentary, partially sectional plan view along lines 3-3 of the wall of FIG. 2.
Figure 4:
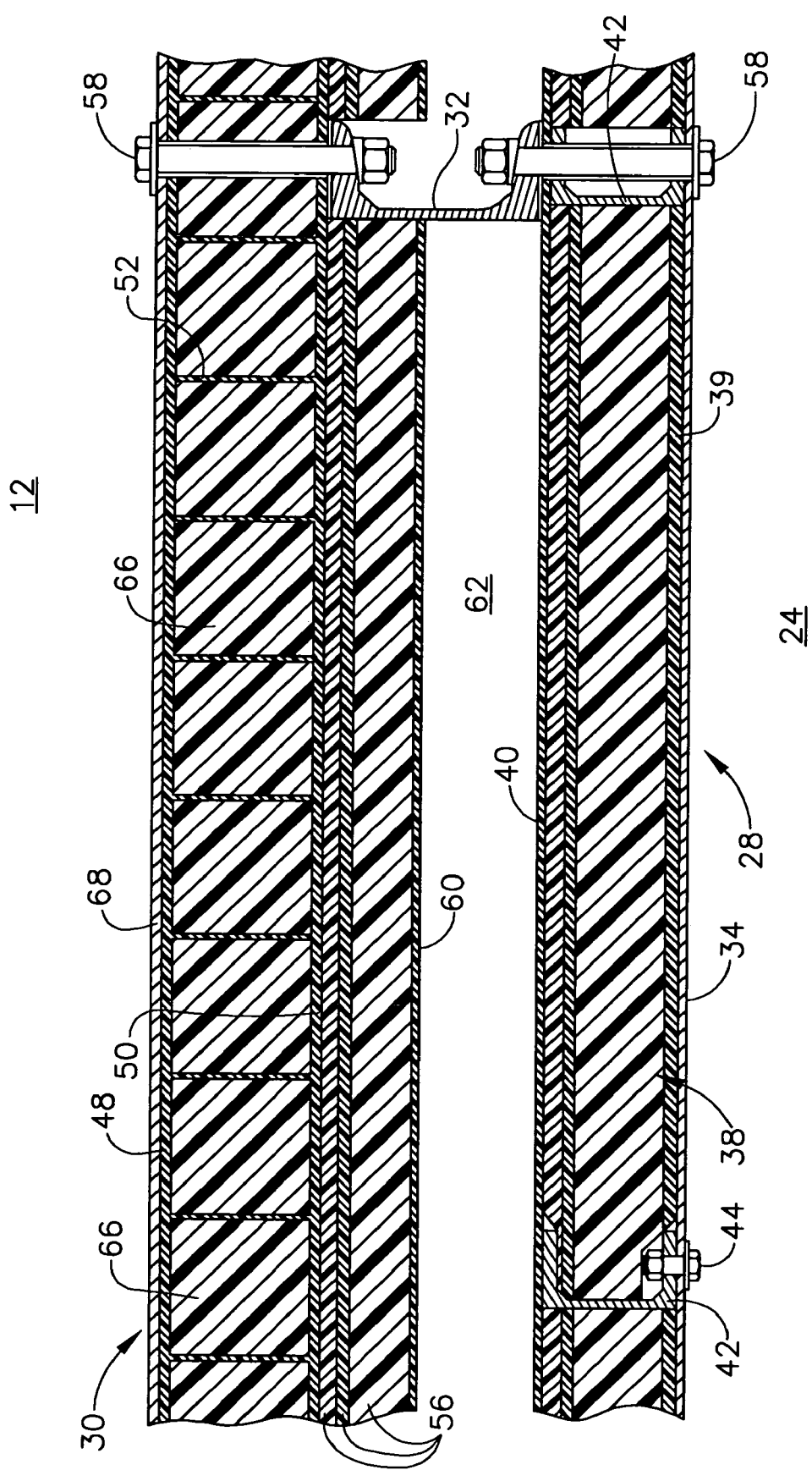
FIG. 4 is diagrammatic, fragmentary, partially sectional plan view similar to FIG. 3 showing another embodiment of an enclosure wall according to a preferred form of the present invention.

Inner panel 28 comprises, in sequence outwardly from enclosure hollow interior 24, an inner panel inner sheet 34, typically of a metal such as steel, at hollow interior 24 and including a plurality of perforations 36 therethrough. At sheet 34 is an inner panel sound absorption member 38 substantially made of commercially available non-metallic sound absorption material, for example a polymeric foam or porous material such as is currently made of such materials as polyurethane, melamine, etc. In FIGS. 2, 3 and 4, member 38 is shown to include a plurality of layers that can be of the same or different materials as desired for sound attenuation. Typically, member 38 includes a thin film facing 39, for example of a metalized polymeric material. Inner panel 28 includes an inner panel outer sheet 40 substantially made of a non-metallic material, for example of a fiber reinforced epoxy resin matrix, at sound absorption member 38. Inner panel 28 includes a panel stiffening member 42, also shown in cross section in FIGS. 3 and 4, between inner panel inner sheet 34 and inner panel outer sheet 40. In the drawings, stiffening member 42 is shown in a convenient form generally of a "C" shaped channel about sound absorption member 38, although other shapes such as a "Z" shaped channel can be used. Preferably, stiffening member 42 is made substantially of a non-metallic composite material, for example fiber reinforced, to provide a combination of lightweight and strength. Associated with inner panel 28 is inner panel fastening means shown generally at 44, for example shown as typical bolts, nuts, spacers, and pressure plates. However, fastening means can comprise interface bonding or adhesive type materials. Fastening means 44 are provided to hold the inner panel inner sheet 34, sound absorption material 38, and inner panel outer sheet 40 in sequence, and to hold stiffening member 42 within inner panel 28.

Outer panel 30 comprises, in sequence inwardly from outside 12 of enclosure 27, outer panel sandwich member shown generally at 46 substantially made of a non-metallic composite material, preferably fiber reinforced for enhanced stiffness. Sandwich member 46 includes spaced-apart sandwich member first and second walls 48 and 50, respectively, and a plurality of spaced-apart transverse walls 52 therebetween to define sandwich member hollow chambers 54. Outer panel heat and fire resistant and sound absorption member 56, at sandwich member second wall 50, substantially is made of a commercially available non-metallic material, for example a polymeric foam or porous material such as is currently made of such materials as polyurethane, melamine, etc. In FIGS. 2, 3 and 4, member 56 is shown to include a plurality of layers that can be of the same or different materials as desired for sound attenuation. Typically, member 56 includes a thin film facing 60 for example of a metalized polymeric material.

Figure 7:
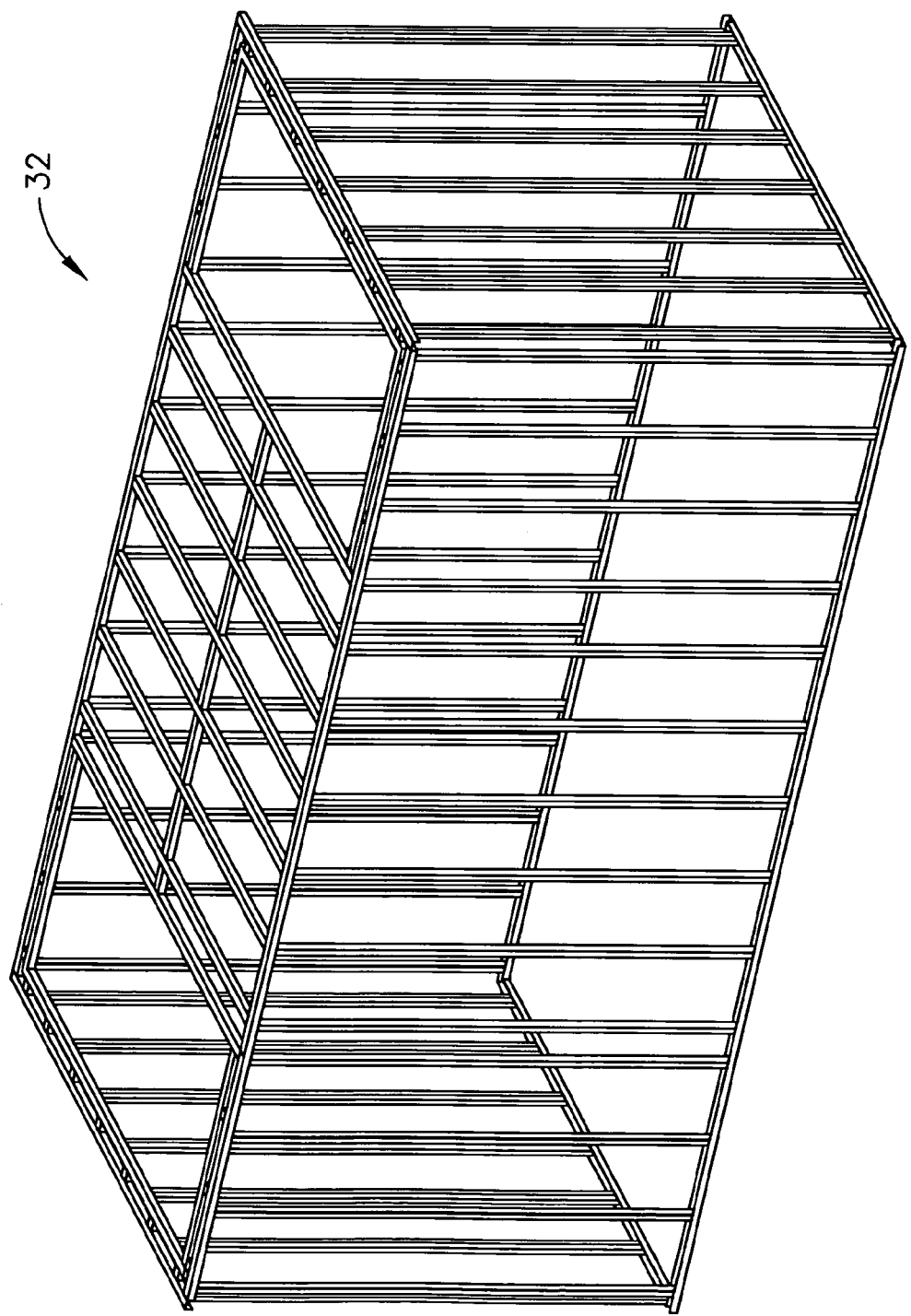
FIG. 7 is a diagrammatic perspective view of an enclosure skeletal framework on which the inner and outer panels or their segments can be mounted to provide an enclosure.

Included in enclosure wall 26 is support frame 32, shown in one form as an enclosure skeletal framework in the diagrammatic perspective view of FIG. 7. Support frame 32 in the embodiments of the drawings is shown as a metal structure. However for some applications, other materials, for example fiber reinforced composites, can be used. Inner and outer panels 28 and 30 are secured at support frame 32 by support frame fastening means represented at 58 in FIG. 2 and shown in more detail in FIGS. 3 and 4. Fastening means 58, for example shown as typical bolts, nuts, spacers, and pressure plates, are provided to enable support frame 32 to support and hold inner and outer panels 28 and 30 in spaced-apart relationship to define space 62 therebetween. However, fastening means can comprise interface bonding or adhesive type materials. Also included in enclosure wall 26 is a plurality of vibrator isolators 64, at least one between and in contact with support frame 32 and with each of inner panel 28 at inner panel outer sheet 40 and outer panel 30 at member 56. In the embodiment of the drawings, vibrator isolators 64 are shown as a resilient material, for example rubber or other resilient polymer, to damp vibration transmission between inner wall 28 and outer wall 30. However, other vibration damping materials or structures providing the same function can be used.

The diagrammatic, fragmentary, partially sectional view of FIG. 4 shows a preferred embodiment of the invention in which hollow chambers 54 of outer panel sandwich member 46 shown in FIG. 2 include cores 66 to provide additional sound transmission loss through outer panel 30. Cores 66, that preferably substantially fill hollow chambers 54, were made substantially of a non-metallic foam or porous material, in one example a phenolic foam material. In the embodiment of FIG. 4, outer panel 30 includes an external sheet 68, for example of thin metal, bonded with sandwich member first wall 48 if desired to increase sound transmission loss and to provide additional fire and external damage protection.

Figure 5:
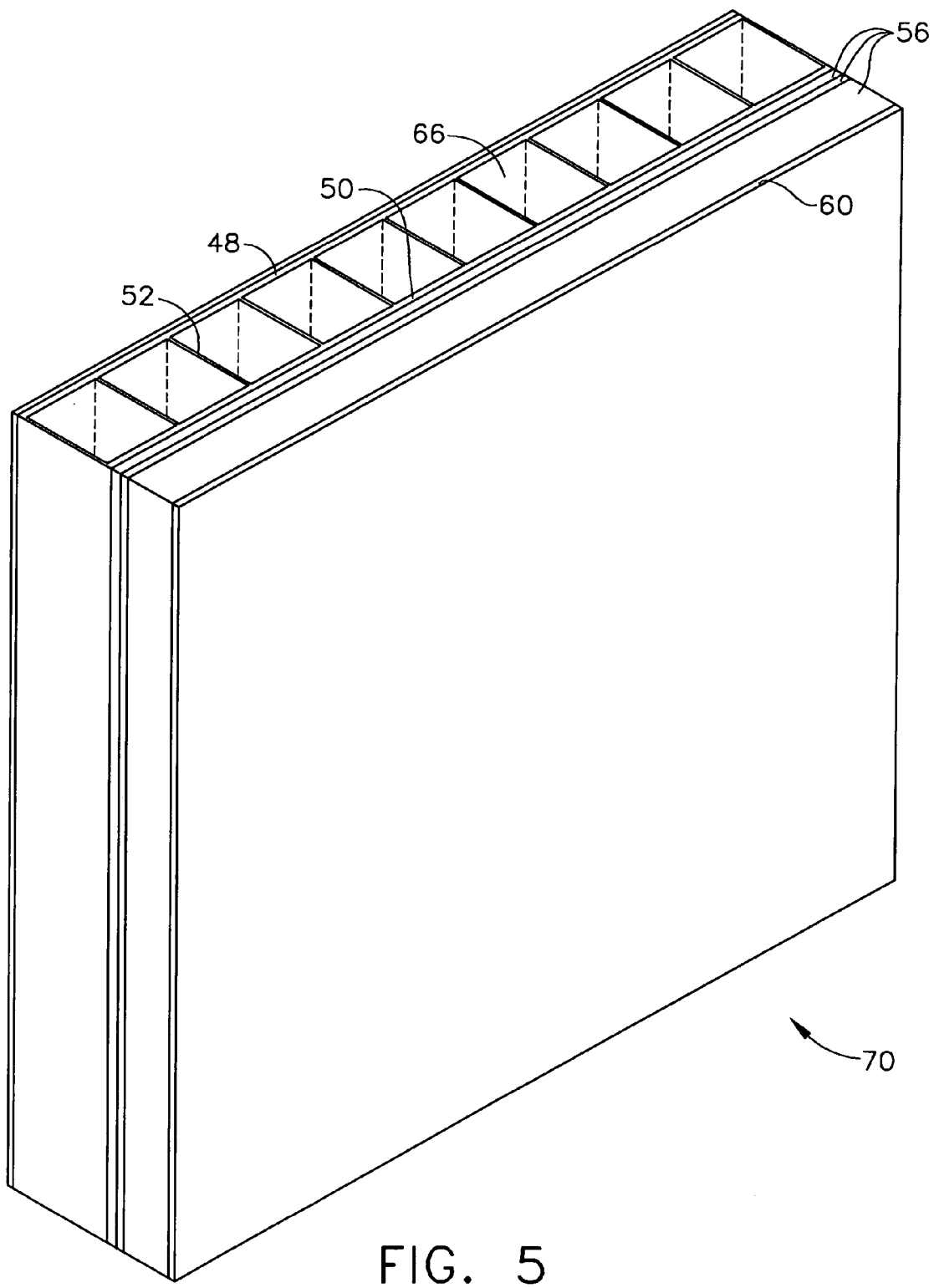
FIG. 5 is a diagrammatic perspective view of an individual segment of an outer panel, a plurality of which can be used to construct an enclosure.
Figure 6:
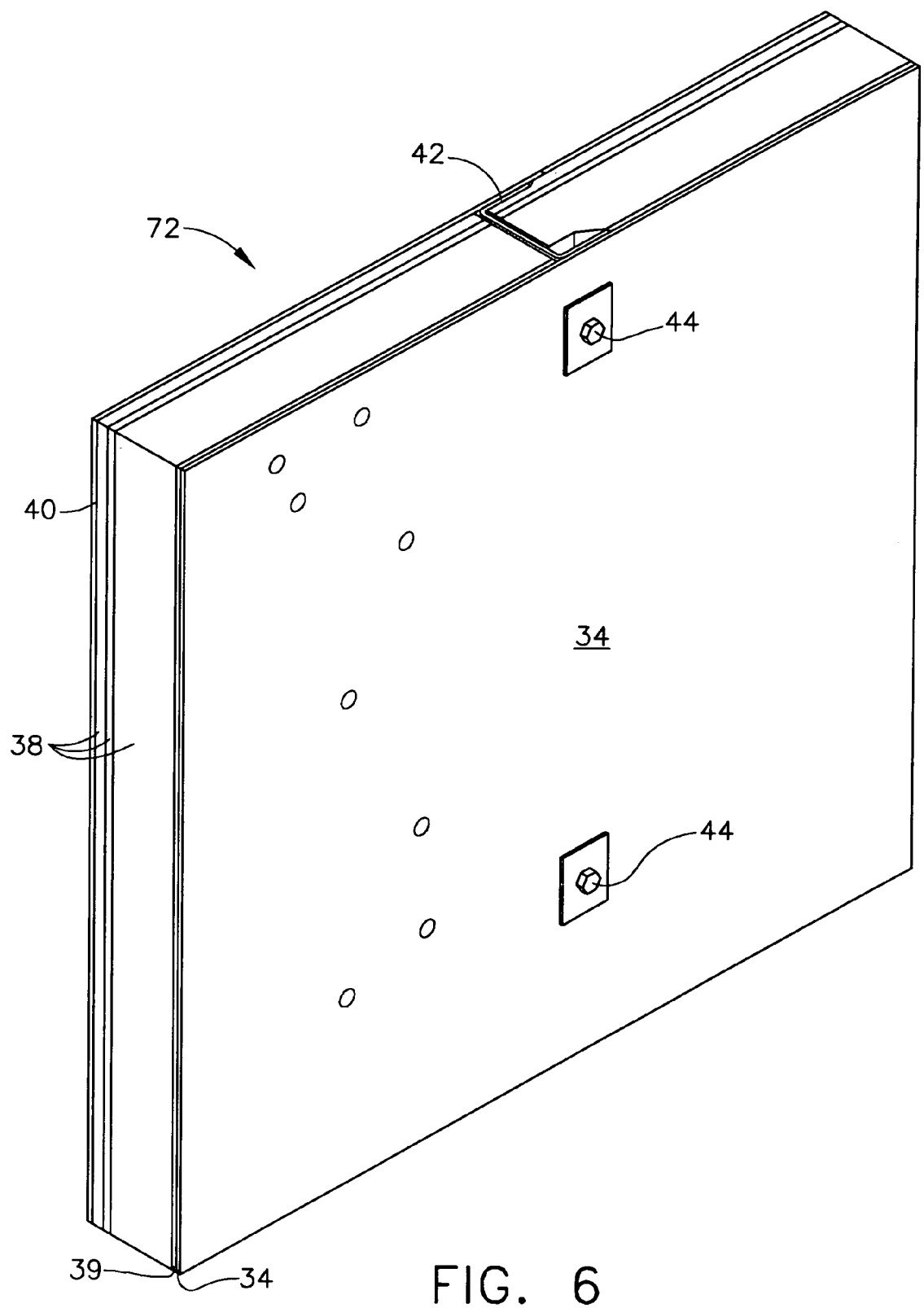
FIG. 6 is a diagrammatic perspective view of an individual segment of an inner panel, a plurality of which can be used to construct an enclosure.

In the assembly of enclosure 27 on an enclosure skeletal framework shown generally at 32 in the diagrammatic perspective view of FIG. 7, inner panel 28 and outer panel 30 can be made as individual complete panels for example generally planar, as panel segments, or their combination. FIG. 5 is a diagrammatic perspective view of an embodiment of an outer panel segment shown generally at 70 of outer panel 30 described in connection with FIG. 4, without inclusion of external metal sheet 68. FIG. 6 is a diagrammatic perspective view of an embodiment of an inner panel segment shown generally at 72 of inner panel 28 described in connection with FIGS. 2, 3 and 4.

In one type of assembly of an enclosure wall 26, outer panel 30 can be made as a complete panel and inner panel 28 can comprise a plurality of inner panel segments 72. In another example, inner panel 28 and outer panel 30 each can be provided as a plurality of panel segments 72 and 70 respectively, and assembled with vibrator isolators 64 at support frame 32, for example in the form of an enclosure skeletal framework shown in FIG. 7. Such panels and/or panel segments are fastened, for example with fastening means 58, at support frame 32 with vibrator isolators 64 therebetween. With panels in panel segment form, it is desirable to provide appropriate barrier arrangements or materials at interfaces between adjacent panel segments to inhibit sound transmission through the interface.

In one evaluation, the transmission loss characteristics of the combination of forms of inner panel 28 and outer panel 30 of the present invention as shown and described in connection with FIG. 4, including cores 66 in chambers 54, were compared with a current, prior art wall structure as described in connection with FIG. 1. The graphical presentation of FIG. 8 summarizes data resulting from such evaluation. In FIG. 8, data identified as 037 resulted from testing of prior art structure 10 of FIG. 1 at 10.0 lb/ft$^2$; data identified as 041 resulted from testing of the combination of inner panel 28 and outer panel 30 of the present invention at 7.3 lb/ft$^2$; and data identified as 045 resulted from testing of the combination of inner panel 28 and outer panel 30 of the present invention at 5.1 lb/ft$^2$. The data of FIG. 8 show the significant improvement in sound transmission loss through a combination of an inner and an outer panel constructed according to the present invention when compared with a current prior art structure.

The present invention provides an enclosure with a significantly improved combination of reduced weight and structural stability along with sound loss characteristics and heat and fire resistance through the arrangement and use primarily of non-metallic materials. Although the present invention has been described in connection with specific examples, materials and structures, it should be understood that they are intended to be representative of, rather than in any way limiting on, the scope of the present invention. Those skilled in such arts as those relating to sound and heat energy, materials, and enclosure designs will understand that the invention is capable of variations and modifications without departing from the scope of the appended claims.

What is claimed is:

1. An enclosure for apparatus that, during operation, generates heat energy, sound energy, or heat and sound energy, comprising at least one wall defining at least a portion of an enclosure hollow interior, the wall comprising the combination of:
   an inner panel comprising, in sequence outwardly from the enclosure hollow interior:
      an inner panel inner sheet at the hollow interior and including a plurality of perforations therethrough;
      an inner panel sound absorption member comprising non-metallic sound absorption material at the inner panel inner sheet;
      an inner panel outer sheet comprising non-metallic composite material at the inner panel sound absorption member; and,
      at least one panel stiffening member between the inner panel inner sheet and the inner panel outer sheet;
   an outer panel comprising in sequence inwardly from outside of the enclosure:
      an outer panel sandwich member comprising non-metallic composite material including spaced-apart sandwich member first and second walls and a plurality of spaced-apart transverse walls between the sandwich member first and second walls defining sandwich member hollow chambers; and,
      an outer panel heat and fire resistant and sound absorption member comprising non-metallic heat and fire resistant material and sound absorption material at the outer panel sandwich member second wall;
   a support frame secured between the inner and outer panels to support and hold the inner and outer panels in spaced apart relationship to define a space between the inner and outer panels; and,
   a plurality of vibrator isolators, at least one between and in contact with the support frame and each of the inner panel and outer panel.

2. The enclosure of claim 1 in which the panel stiffening member of the inner panel is made substantially of a non-metallic composite material.

3. The enclosure of claim 1 in which the outer panel sandwich member includes, in sandwich member hollow chambers, cores of a porous, non-metallic material.

4. The enclosure of claim 1 in which:
   the inner panel includes inner panel fastening means to hold the inner panel inner sheet, the inner panel sound absorption member and the inner panel outer sheet in sequence; and,
   the support frame includes support frame fastening means.

5. The enclosure of claim 4 in which:
   the inner panel inner sheet is metal;
   the inner panel sound absorption member comprises a plurality of layers each made substantially of non-metallic material;
   the panel stiffening member of the inner panel is made substantially of a non-metallic composite material;
   the outer panel sandwich member is made substantially of a non-metallic composite material and includes in sandwich member hollow chambers cores of a porous, non-metallic material; and,
   the outer panel heat and fire resistant material and sound absorption member comprises a plurality of layers.

6. The enclosure of claim 1 in which the outer panel includes an external metal sheet bonded with the sandwich member first wall.

7. The enclosure of claim 1 in which the wall comprises a substantially continuous outer panel and a plurality of inner panel segments.

* * * * *